US009173375B1

(12) United States Patent
Schleichardt et al.

(10) Patent No.: US 9,173,375 B1
(45) Date of Patent: Nov. 3, 2015

(54) ANIMAL FEEDER

(71) Applicants: Thomas Schleichardt, Chapman, NE (US); Kristin Schleichardt, Chapman, NE (US)

(72) Inventors: Thomas Schleichardt, Chapman, NE (US); Kristin Schleichardt, Chapman, NE (US)

( * ) Notice: Subject to any disclaimer, the term of this patent is extended or adjusted under 35 U.S.C. 154(b) by 0 days.

(21) Appl. No.: 13/690,457

(22) Filed: Nov. 30, 2012

Related U.S. Application Data

(60) Provisional application No. 61/566,038, filed on Dec. 2, 2011.

(51) Int. Cl.
*A01K 61/02* (2006.01)
*A01K 5/00* (2006.01)

(52) U.S. Cl.
CPC .......................................... *A01K 5/00* (2013.01)

(58) Field of Classification Search
CPC ...... A01K 5/00; A01K 5/0216; A01K 5/0225
USPC ............ 119/51.01, 51.02, 51.11, 51.13, 52.1, 119/52.4, 53, 56.1, 56.2, 61.31, 72, 72.5
See application file for complete search history.

(56) References Cited

U.S. PATENT DOCUMENTS

| 516,339 | A | * | 3/1894 | Wellsteed | 119/53.5 |
|---|---|---|---|---|---|
| 1,355,399 | A | * | 10/1920 | Kelley | 119/57.91 |
| 1,728,526 | A | * | 9/1929 | Brunhoff | 222/185.1 |
| 2,064,719 | A | * | 12/1936 | Baldwin | 222/339 |
| 2,841,312 | A | * | 7/1958 | Bello | 222/181.2 |
| 3,125,255 | A | * | 3/1964 | Kaiser | 222/189.06 |
| 3,272,399 | A | * | 9/1966 | Dight | 222/232 |
| 3,987,970 | A | * | 10/1976 | Burkett | 241/43 |
| 4,860,930 | A | * | 8/1989 | Tu | 222/231 |
| 5,233,941 | A | * | 8/1993 | Ayliffe et al. | 119/57.91 |
| 5,263,437 | A | * | 11/1993 | Murphrey | 119/53.5 |
| 5,291,855 | A | * | 3/1994 | Laverty | 119/52.3 |
| 5,292,037 | A | * | 3/1994 | Held | 222/339 |
| 5,499,749 | A | * | 3/1996 | Conant | 222/233 |
| 5,555,843 | A | * | 9/1996 | Harmon | 119/57.8 |
| 5,803,140 | A | * | 9/1998 | Jodoin | 141/332 |
| 6,129,049 | A | * | 10/2000 | Rasmussen et al. | 119/52.1 |
| 6,868,801 | B2 | * | 3/2005 | Rovira Badia et al. | 119/51.5 |
| 6,959,664 | B1 | * | 11/2005 | Keuter et al. | 119/54 |
| 7,114,536 | B2 | * | 10/2006 | Guthrie | 141/337 |
| 7,237,582 | B1 | * | 7/2007 | Harvey | 141/330 |
| 7,798,098 | B1 | * | 9/2010 | Patterson | 119/51.11 |
| 7,987,816 | B1 | * | 8/2011 | Walsh | 119/61.56 |

* cited by examiner

*Primary Examiner* — Rob Swiatek
*Assistant Examiner* — Ebony Evans
(74) *Attorney, Agent, or Firm* — Suiter Swantz pc llo

(57) ABSTRACT

An animal feeder includes a funnel dispenser to control feed flow and dispersal. The funnel dispenser includes a main support collar to support the funnel dispenser and allow the funnel dispenser to freely rotate. The funnel dispenser includes a feeding tube and a funnel to channel feed into the feeding tube. The funnel extends into the feeding tube at least one third of the diameter of the feeding tube.

11 Claims, 7 Drawing Sheets

ANIMAL FEEDER

PRIORITY

The present application claims the benefit under 35 U.S.C. §119(e) of U.S. Provisional Application Ser. No. 61/566,038, filed Dec. 2, 2011, which is incorporated herein by reference.

FIELD OF THE INVENTION

The present invention is directed generally toward the field of feed dispensers and more particularly to an animal feeder apparatus.

BACKGROUND OF THE INVENTION

Feed dispensers may be utilized to provide feed to livestock and may be utilized to provide feed to wild animals, such as deer, elk, and other wild game. Current feed dispensers, particularly those used to feed deer, feature tripod style legs or other frames that extend outward to support the feed container. This style, while providing stability, has disadvantages. For instance, current feeders do not blend well into the environment, which is desirable for animals to feel comfortable enough to feed from it. Also, when animals with antlers such as deer and elk feed from current feeders, their horns can become entangled and damaged from contact with the legs and stands. Thus there is a need for an improved style of feeder.

Consequently, it would be advantageous if an apparatus existed that is suitable for reliably providing feed to certain animals in a natural environment.

SUMMARY OF THE INVENTION

Accordingly, the present invention is directed to a novel apparatus for reliably providing feed to certain animals in a natural environment.

At least one embodiment of the present invention may include a funnel dispenser to control feed flow and dispersal. The funnel dispenser may include a main support collar to support the funnel dispenser and allow the funnel dispenser to freely rotate. The funnel dispenser may include a feeding tube and a funnel to channel feed into the feeding tube. The funnel may extend into the feeding tube at least one third of the diameter of the feeding tube.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
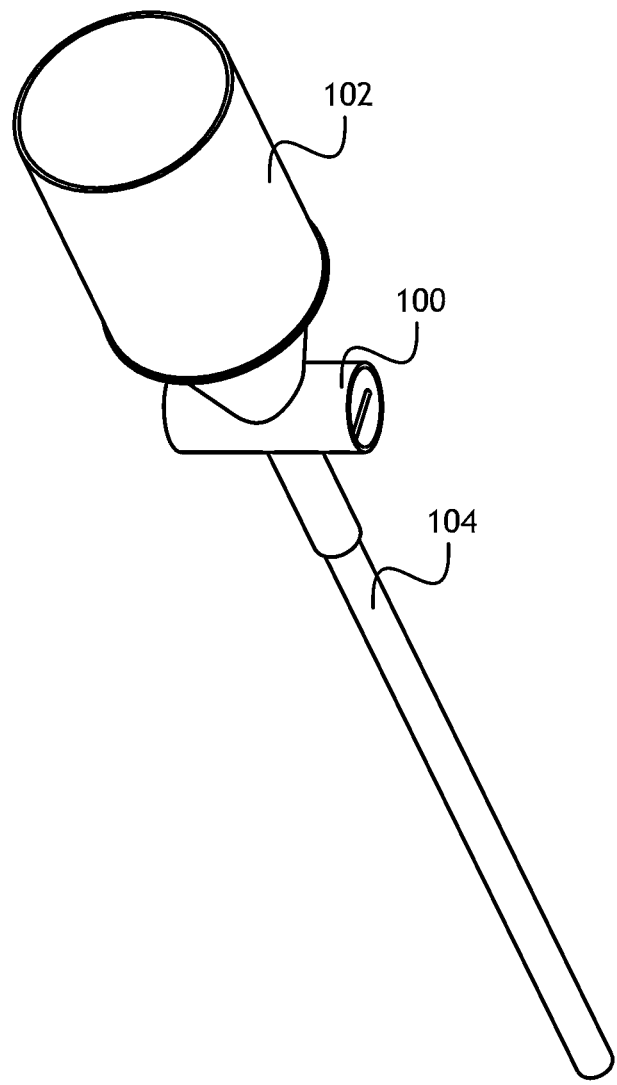
FIG. 1 shows a perspective view of a feeder apparatus according to at least one embodiment of the present invention.

Referring to FIG. 1, a perspective view of a feeder apparatus according to at least one embodiment of the present invention is shown. The present disclosure includes an animal feeder, particularly a deer feeder, which solves many of the problems of conventional deer feeders. Conventional deer feeders utilize a tripod style stand or stand with multiple legs extending from or around the feeder.

The animal feeder of the present disclosure is a feeder that is supported by a single, main support 104 that is placed in the ground. The feeder may include a hopper 102 with a funnel dispenser 100. In at least one embodiment of the present invention, the hopper 102 may be a barrel, repurposed as an animal feed hopper. In such an embodiment, the funnel dispenser 100 may be specifically configured to attach to such a repurposed hopper.

In order for wild animals to feel comfortable enough to feed from an animal feeder, the feeder must blend in well with its environment. Current feeders have stands with multiple legs extending outward from the feeder itself. They are bulky and do not blend well into the environment. At least one embodiment of a feeder according to the present invention utilizes a stand that is comprised of a single main support 104. This allows the feeder to blend in better with trees and logs in the animals' environment which entices the animals to utilize the feeder. Another advantage of the single main support 104 is the ability to mount the animal feeder on un-level or sloped ground.

Feeders are often used to provide vital nutrients to deer to stimulate antler growth and development. However, deer can cause damage to their antlers by feeding from current feeders. A male whitetail deer will shed and regrow its antlers every year. During antler growth, which occurs numerous times throughout a male deer's life, antlers are extremely sensitive and very delicate. Damage can occur to the antlers when they rub against or hit hard surfaces. When deer try to feed from current deer feeders, the animals' antlers regularly come into contact with the stand of the feeder, causing breaks, indentations, and other injury to the delicate tissue. At least one embodiment of the present invention solves this issue by utilizing a single main support 104 from the bottom of the feeder.

Figure 2:
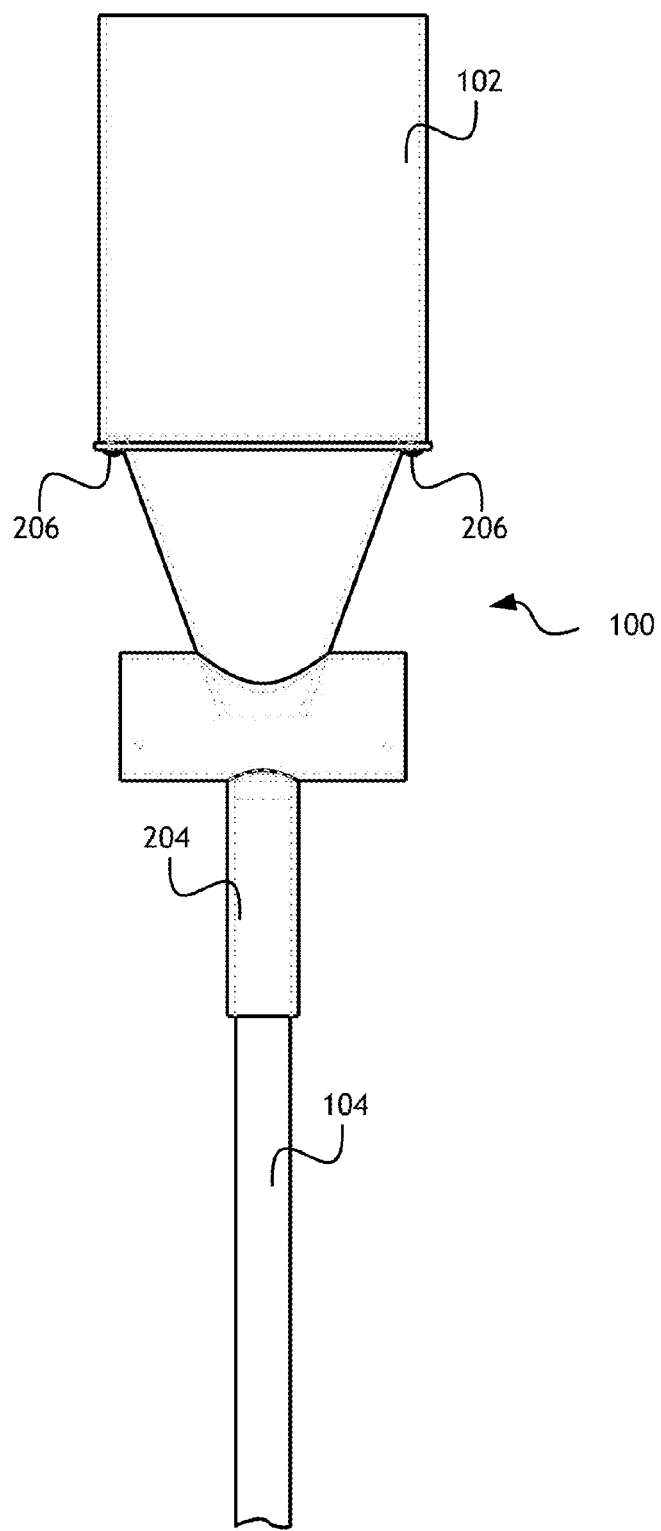
FIG. 2 shows a side, transparent view of the feeder apparatus of FIG. 1.

Referring to FIG. 2, a side, transparent view of the feeder apparatus of FIG. 1 is shown. At least one embodiment of the present invention includes a single, main support 104 that is placed in the ground. The main support 104 may engage a main support collar 204 that surrounds the main support 104. The main support collar 204 may be part of a funnel dispenser 100, and configured to allow the funnel dispenser 100 to rotate about the main support 104.

In at least one embodiment of the present invention, a hopper 102 may be connected to the funnel dispenser. The hopper 102 may be a barrel, repurposed as an animal feed hopper. In such an embodiment, the feeder may include one or more connectors 206 to secure the funnel dispenser 100 to the hopper 102. Connectors 206 may include such elements as self-tapping screws.

Figure 3:
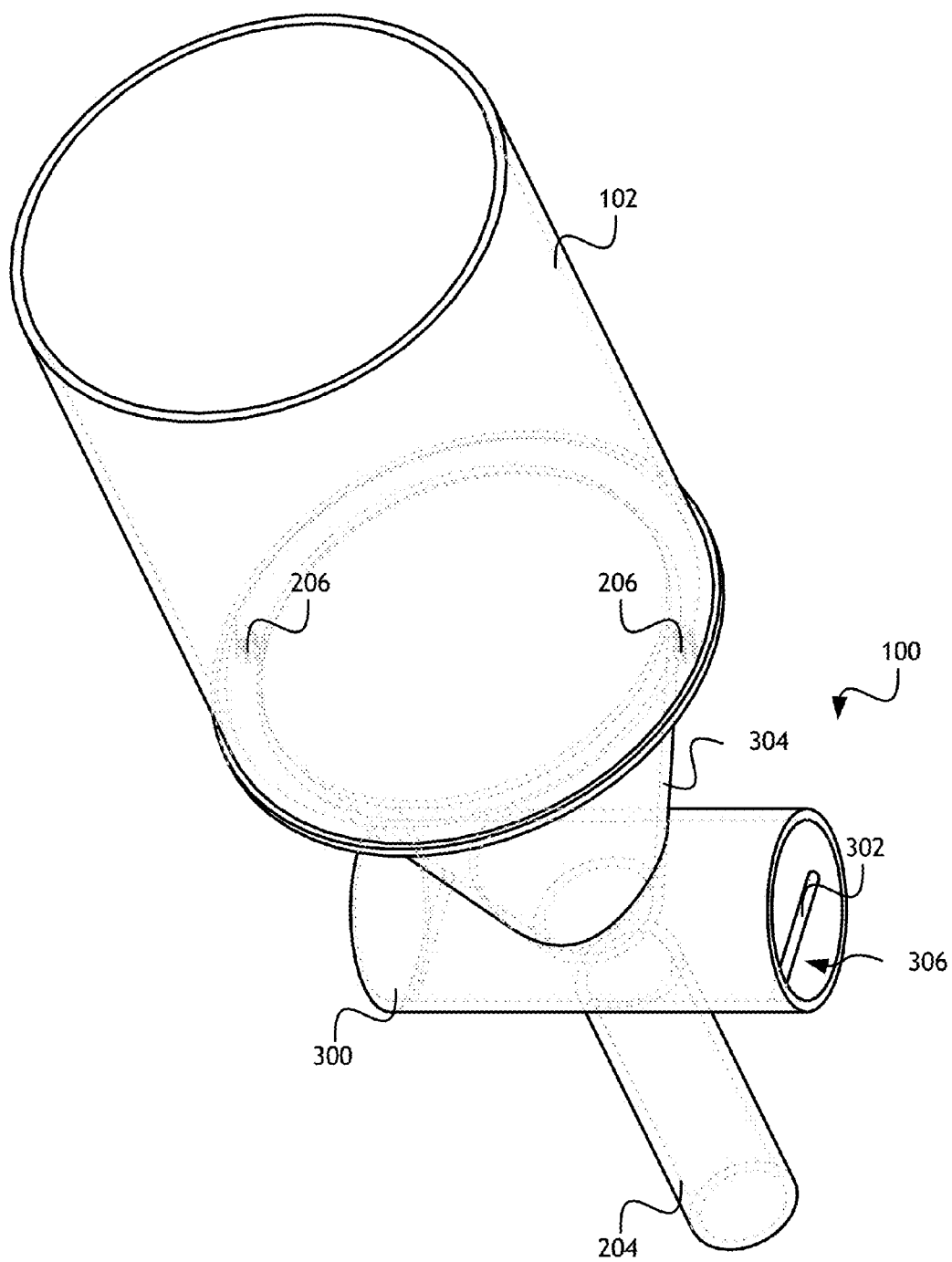
FIG. 3 shows a perspective, transparent, close-up view of a feeder apparatus according to at least one embodiment of the present invention.

Referring to FIG. 3, a perspective, transparent, close-up view of a feeder apparatus according to at least one embodiment of the present invention is shown. At least one embodiment of the present invention includes a funnel dispenser 100 connected to a hopper 102 by one or more connectors 206. The funnel dispenser 100 may include a main support collar 204 configured to surround and sit atop a main support (see FIG. 1 and FIG. 2; main support 104). The main support collar 204 may be connected to a feeding tube 300, and configured to allow the funnel dispenser 100 to rotate about the main support. In at least one embodiment of the present invention, the funnel 304 and feeding tube 300 may be supported by means other than a main support and main support collar 204. For example, the feeding tube 300 may be configured to attach to a tripod. In another embodiment of the present invention, the main support collar 204 may be configured to engage a support structure having more than a single support.

The feeding tube 300 may include one or more flow stops 302 to prevent animal feed from freely flowing out of the feeding tube 300. A flow stop 302 may be a rod or bar obstructing a portion of the feeding tube. A flow stop 302 may be bent so as to more effectively prevent feed from flowing out of the feeding tube 300 while continuing to allow animals access to feed.

The feeding tube 300 may be connected to a funnel 304 that deposits feed into the feeding tube 300. The feeding tube 304 may have openings 306 on each end. An animal's muzzle fits into the feeding tube 300, making the muzzle the only portion of the animal that ever comes into contact with the feeder. The openings 306 may be big enough to accommodate a deer inserting its muzzle and thereby gaining access to the feed at the center of the funnel dispenser 100. Because only the deer's muzzle comes into contact with the feeder, the deer's eyes are left with a substantially unobstructed view of the surrounding area, enhancing the deer's security. Furthermore, deer reaching into the center of the feeding tube 300 to the funnel 304 act as their own cleaning system. Generally, prior art feeders have long tubes to present the feed to the animals. Long tubes will plug and require the owner to either take the prior art feeder apart or push long brushes up into the prior art feeder to clean out the clogged feed. As the deer eat, the feed empties from the hopper 102, through the funnel 304, into the feeding tube 300, keeping the feeding tube 300 replenished. The openings 306 that animals may feed from may extend outward from the funnel 304 with sufficient distance to hold the feed but stop the free flow of feed to the ground.

Figure 4:
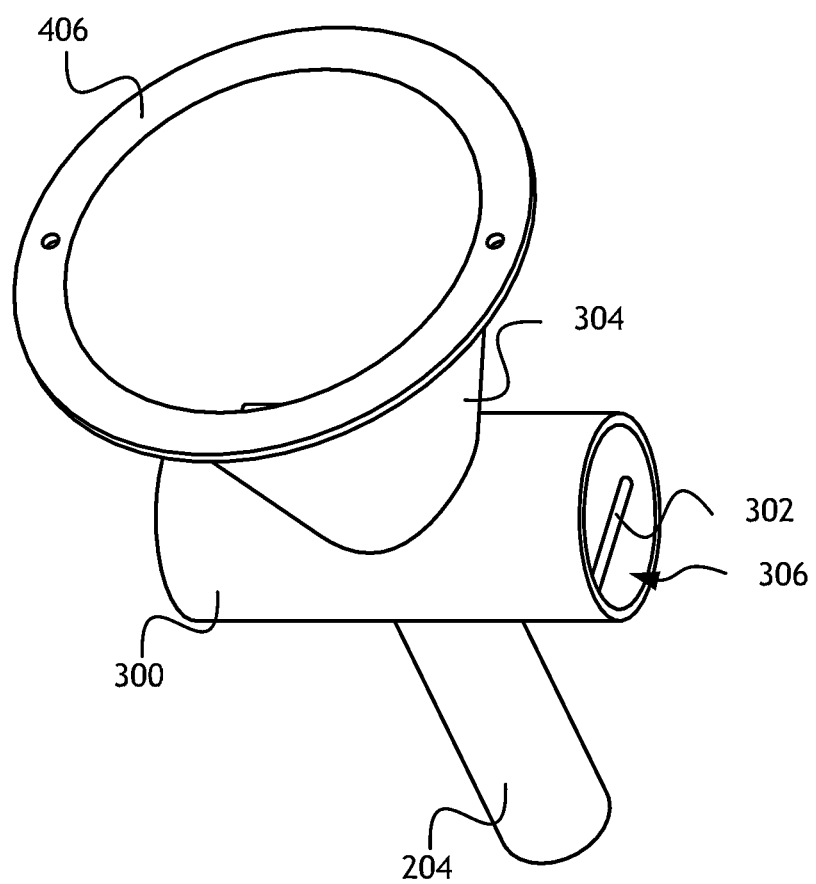
FIG. 4 shows a perspective view of a funnel dispenser according to at least one embodiment of the present invention.

Referring to FIG. 4, a perspective view of a funnel dispenser according to at least one embodiment of the present invention is shown. The funnel dispenser includes a main support collar 204 configured to receive a single main support. The main support collar 204 may allow the funnel dispenser to freely rotate. The main support collar 204 may be connected to a feeding tube 300. The feeding tube 300 may include openings 306 at both ends to allow desired animals access to feed. The feeding tube 300 may also include flow stops 302 positioned at or near the openings 306 to prevent feed from free flowing out of the openings 306 unless actively removed by a target animal.

The feeding tube 300 may receive feed through a funnel 304 configured to deposit feed into substantially the center of the feeding tube 300 such that the feed may spread out toward the openings 306. The funnel 304 may include a flange 406 configured to allow the funnel 304 to connect to a separate hopper. In at least one embodiment of the present invention, the flange 406 may be configured to receive a plurality of cables (not shown). The plurality of cables may be configured to support the funnel dispenser, a hopper and feed from nearby support elements such as trees or posts.

Figure 5:
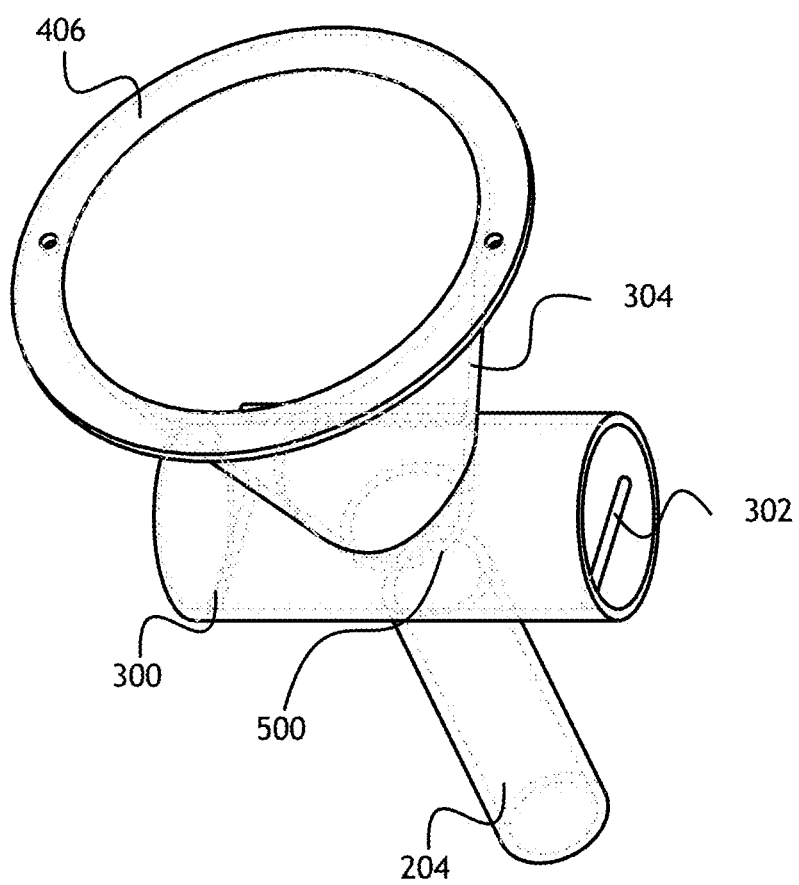
FIG. 5 shows a perspective, transparent view of the funnel dispenser of FIG. 4.

Referring to FIG. 5, a perspective, transparent view of the funnel dispenser of FIG. 4 is shown. The funnel 304 may extend into the feeding tube 300; for example, the narrow portion 500 of the funnel 304 may terminate at a distance of approximately one third the diameter of the feeding tube 300, or the narrow portion 500 of the funnel 304 may terminate in substantially the center of the feeding tube 300, cushioning and slowing the flow of feed. One skilled in the art may appreciate that the narrow portion 500 of the funnel 304 may extend into the feeding tube 300 within a range of distances. In this embodiment, the funnel 304 further controls the flow of feed into the feeding tube 300. By extending the funnel 304 into the feeding tube 300, a feeding tube 300 large enough to accommodate the desired animals may be used while still restricting the flow of feed to desirable levels.

Figure 6:
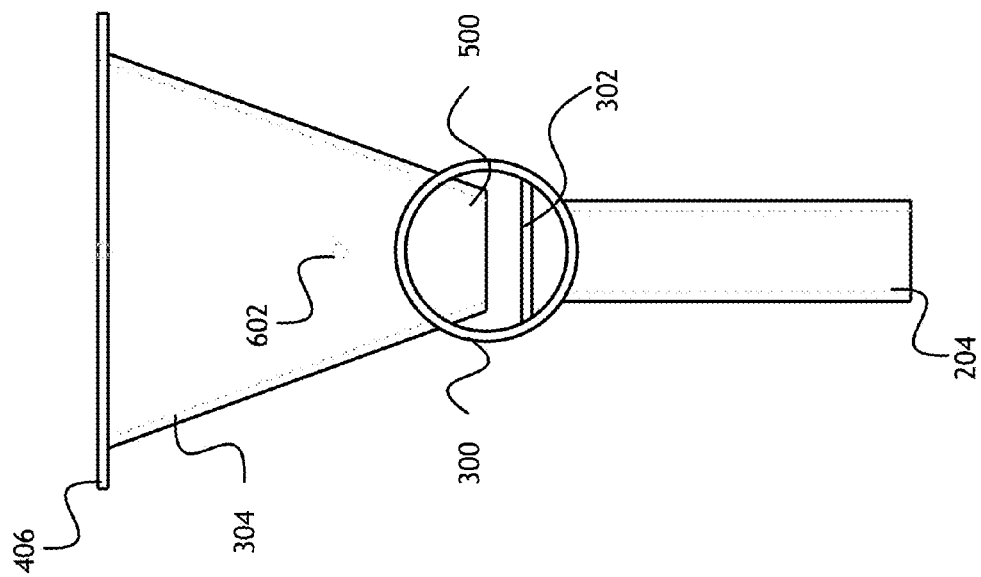
FIG. 6 shows a side, transparent view of the funnel dispenser of FIG. 5.

Referring to FIG. 6, a side, transparent view of the funnel dispenser of FIG. 5 is shown. The funnel 304 extends in the feeding tube 300 such that the narrow portion 500 of the funnel terminates in substantially the center of the feeding tube 300. This embodiment limits feed flow as if the feed tube 300 were more restrictive than it actually is, while still allowing access to feed by large animals. In at least one embodiment of the present invention, the funnel 304 may include a flow control bar 602 to control grain flow through the funnel 304, breaking up clumps and preventing plugging in moist conditions.

Figure 7:
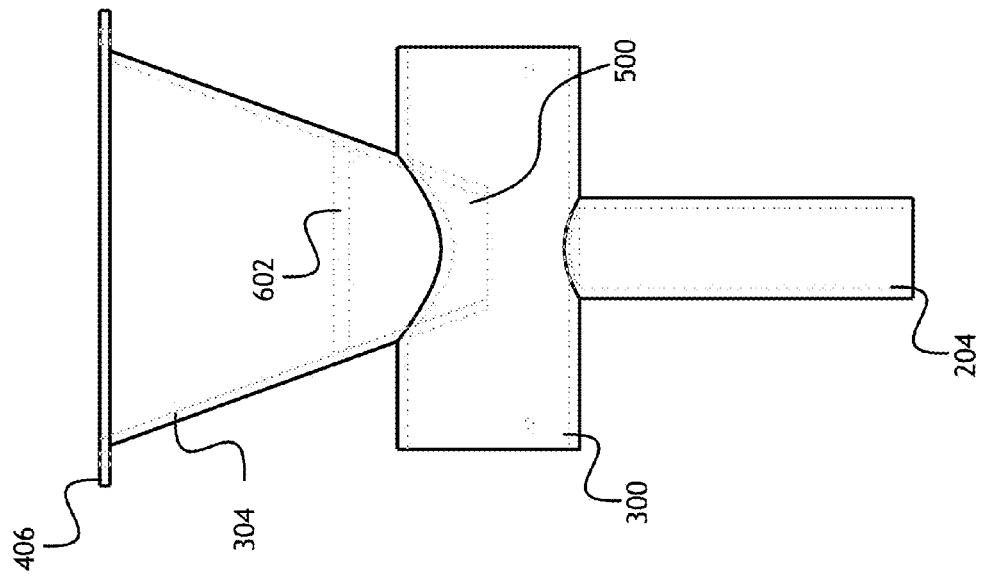
FIG. 7 shows another side, transparent view of the funnel dispenser of FIG. 5.

Referring to FIG. 7, another side, transparent view of the funnel dispenser of FIG. 5 is shown. A feeder according to this embodiment is specially configured to allow large animals with snouts, such as deer or elk, to access feed. At the same time the flow of feed is restricted, reducing waste of feed from free flowing onto the ground. Furthermore, embodiments of the present invention may prevent smaller animals from accessing feed.

Figure 8:
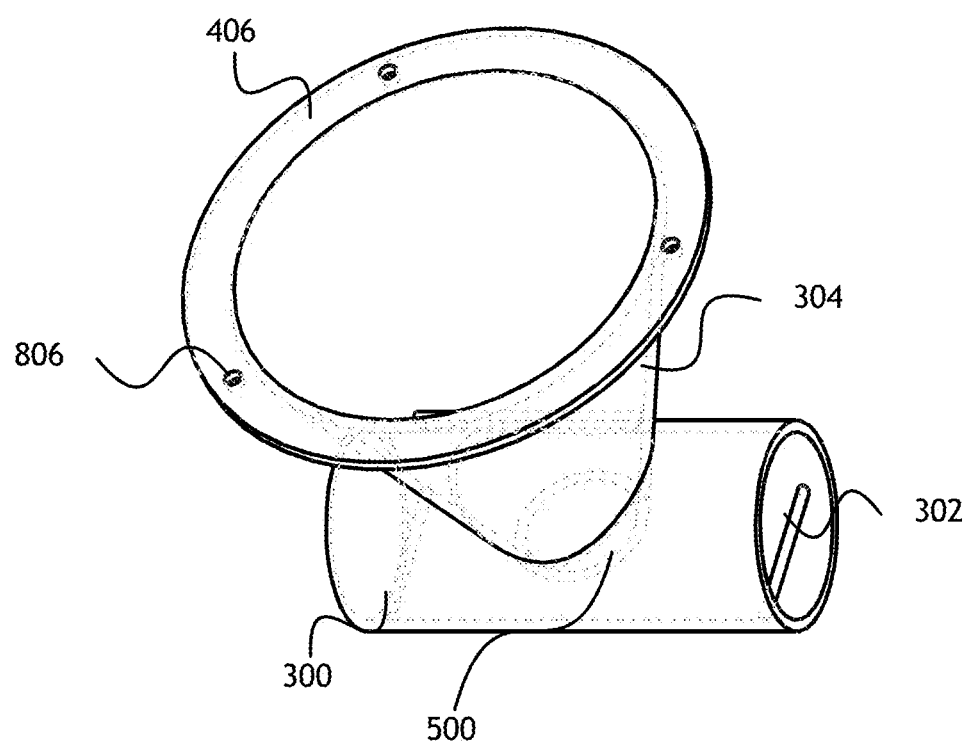
FIG. 8 shows a perspective, transparent view of another funnel dispenser according to at least one embodiment of the present invention.

Referring to FIG. 8, perspective, transparent view of another funnel dispenser according to at least one embodiment of the present invention is shown. The funnel dispenser includes a feeding tube 300. The feeding tube 300 may include openings 306 at both ends to allow desired animals access to feed. The feeding tube 300 may also include flow stops 302 positioned at or near the openings 306 to prevent feed from free flowing out of the openings 306 unless actively removed by a target animal.

The feeding tube 300 may receive feed through a funnel 304 configured to deposit feed into substantially the center of the feeding tube 300 such that the feed may spread out toward the openings 306. The funnel 304 may include a flange 406 with a plurality of cable support points 806. The plurality of cable support points 806 may be configured to receive a plurality of cables (not shown). The plurality of cables may be configured to support the funnel dispenser, a hopper and feed from nearby support elements such as trees or posts.

Current feeders are susceptible to allowing undesirable animals such as raccoons to take food intended for deer. Raccoons are able to climb current feeders and eat from them. Because of the design of embodiments of the present invention, undesirable animals may have difficulty eating from the feeder. At least one embodiment of the feeder is shaped and sized to only allow deer to eat from it.

It is believed that the present invention and many of its attendant advantages will be understood by the foregoing description of embodiments of the present invention, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. An animal feeder apparatus comprising:
    a funnel dispenser comprising:
        a funnel;
        a feeding tube connected to a narrow portion of the funnel, the feeding tube comprising at least two openings; and
        a main support collar connected to the feeding tube, such main support collar configured to engage a single main support,
    wherein:
        the main support collar is configured to:
            support the entire weight of the animal feeder apparatus and animal feed; and
            allow the animal feeder apparatus to rotate about an axis defined by the main support collar;
        the funnel is configured to channel animal feed into the feeding tube;
        the feeding tube is configured to dispense feed toward the at least two openings; and
        the narrow portion of the funnel extends into the feeding tube a distance at least one third the diameter of the feeding tube.

2. The apparatus of claim 1, wherein the feeding tube further comprises one or more flow stops associated with each of the at least two openings, each such flow stop configured to obstruct the flow of feed toward the associated opening, and configured to allow an animal access to feed through such associated opening.

3. The apparatus of claim 1, further comprising a main support having a distal end and a proximal end, wherein the proximal end is configured to rotatably engage the main support collar.

4. The apparatus of claim 1, wherein the funnel comprises a flow control bar configured to prevent plugging in the funnel.

5. The apparatus of claim 1, wherein the funnel comprises a flange configured to connect to a hopper.

6. The apparatus of claim 5, wherein the flange comprises at least one connector configured to secure a hopper to the flange.

7. The apparatus of claim 6, further comprising a hopper connected to the flange, wherein the connector comprises a self-tapping screw.

8. The apparatus of claim 1, further comprising a hopper connected to the funnel.

9. An animal feeder apparatus comprising:
    a funnel dispenser comprising:
        a funnel;
        a flow control bar disposed within the funnel configured to prevent plugging in the funnel; and
        a feeding tube connected to a narrow portion of the funnel, the feeding tube comprising at least two openings and at least one flow stop associated with each of the at least two openings, each such flow stop configured to obstruct the flow of feed toward the associated opening, and configured to allow an animal access to feed through such associated opening;
    a hopper connected to the funnel dispenser; and
    a main support collar connected to the feeding tube, such main support collar configured to engage a single main support;
    wherein:
        the funnel is configured to channel animal feed into the feeding tube;
        the feeding tube is configured to dispense feed toward the at least two openings;
        the narrow portion of the funnel extends into the feeding tube a distance at least one third the diameter of the feeding tube;
        the main support collar is configured to support the entire weight of the animal feeder and animal feed; and
        the main support collar is configured to allow the animal feeder apparatus to rotate about an axis defined by the main support collar.

10. The apparatus of claim 9, further comprising a main support having a distal end and a proximal end, wherein the proximal end is configured to rotatably engage the main support collar.

11. The apparatus of claim 9, wherein the hopper comprises a repurposed barrel.

* * * * *